July 29, 1958     R. W. GRADY     2,844,885
INSTRUMENT FOR MEASURING RAKE OR HOOK ANGLE
Filed Aug. 10, 1954     2 Sheets-Sheet 1
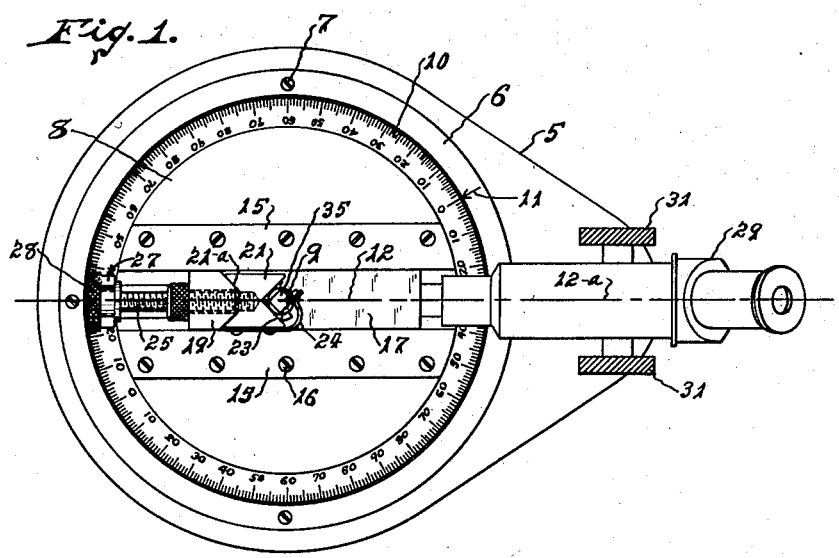
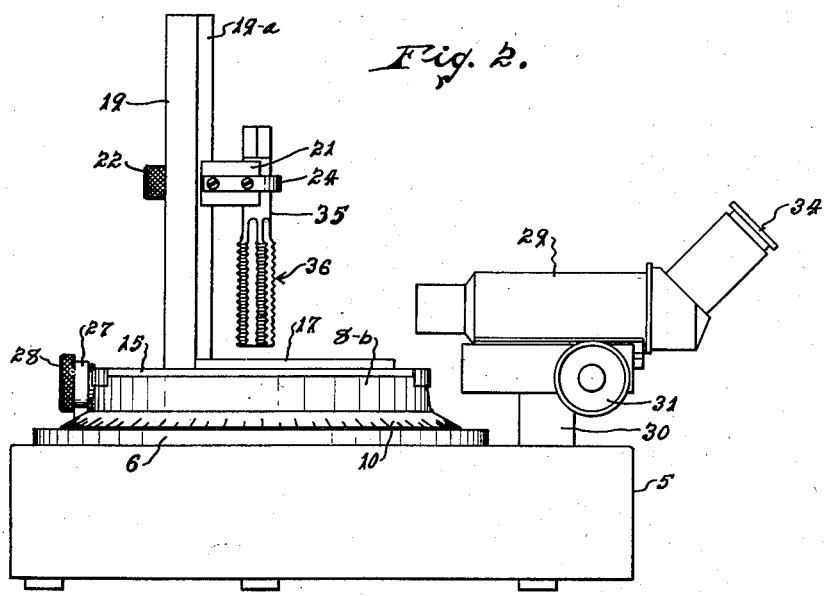
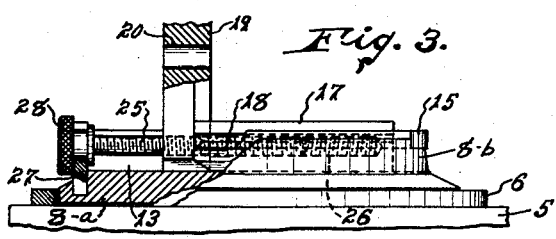
INVENTOR.
ROBERT W. GRADY
BY
*Louis V. Lucia*
ATTORNEY July 29, 1958 R. W. GRADY 2,844,885
INSTRUMENT FOR MEASURING RAKE OR HOOK ANGLE
Filed Aug. 10, 1954 2 Sheets-Sheet 2
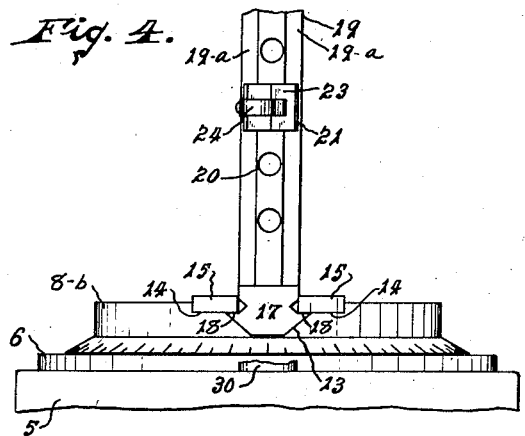
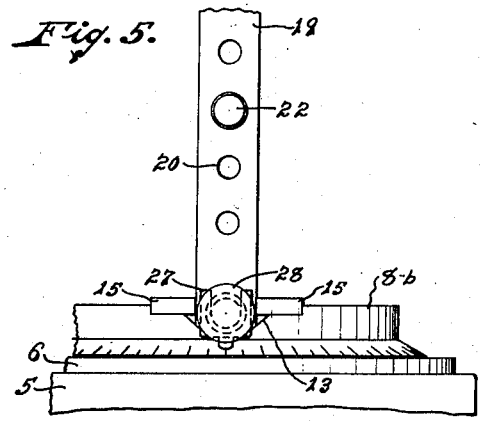
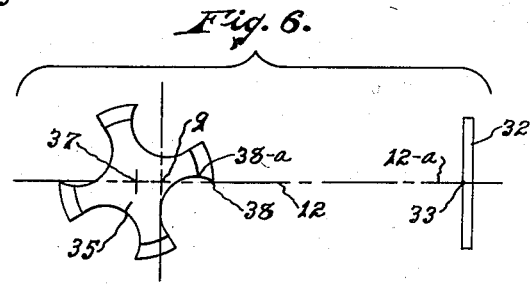
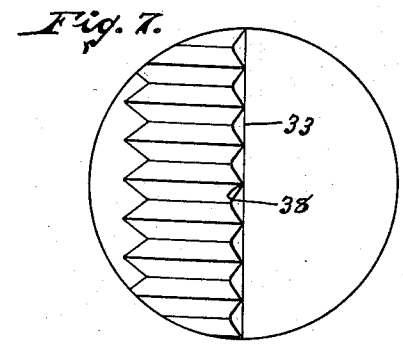
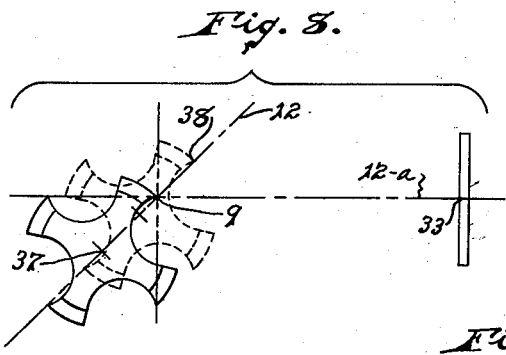
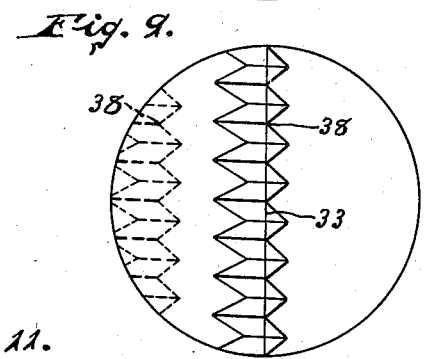
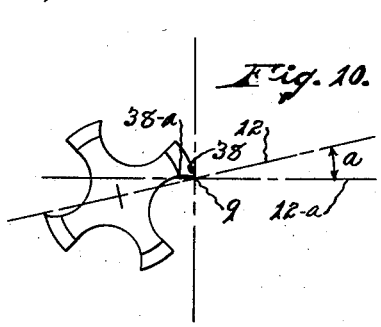
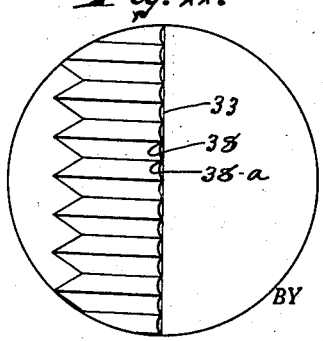
INVENTOR.
ROBERT W. GRADY
BY
ATTORNEY.

United States Patent Office 2,844,885
Patented July 29, 1958

2,844,885
INSTRUMENT FOR MEASURING RAKE OR HOOK ANGLE

Robert W. Grady, West Hartford, Conn.

Application August 10, 1954, Serial No. 448,902

13 Claims. (Cl. 33—201)

This invention relates to an instrument for measuring rake or hook angle, and more particularly to an instrument for determining the rake or hook angle of the cutting faces on the teeth of cutting tools, such as taps, milling cutters, hobs and the like. The device disclosed in this application constitutes an improvement on the structure disclosed in my co-pending application Serial No. 404,175, filed January 15, 1954, now Patent No. 2,844,884, issued July 29, 1958, and entitled Instrument for Measuring the Radial Hook or Rake of Taps.

It is well known by those familiar with cutting tools of the above mentioned type, that "rake angle" refers to the angle of inclination of the cutting faces of the teeth to radial lines through the cutting edges thereof and that this term is generally applied to tools having straight cutting faces. The term "hook angle" is commonly employed in connection with tools having teeth with concave cutting faces and, with particular reference to taps, refers to the angle formed by a plane extending through the points at the crest and at the roots of the tap teeth with a radial plane through said points at the crests thereof.

In the use of cutting tools of the above mentioned type, the rake or hook angle is determined by the type of material to be cut and varies with the machineability thereof. It is of the utmost importance, and particularly in precision machining operations, that a cutting tool having the proper rake or hook angle be selected for the specific material of the work piece.

Prior to the invention of the device disclosed in my above mentioned patent, the measurement of the rake or hook angle of cutting tools, and particularly of taps, was a time consuming and tedious operation. My prior device greatly simplified the task of measuring taps, but its use was limited to such tools.

It is an object of this invention to provide an improved instrument which is particularly useful for measuring the rake or hook angle of taps, but which can also be easily adapted for measuring other cutting tools.

A further object of the invention is to provide a device for the stated purpose in which the cutting tool is manipulated relatively to a stationary magnifying device, as distinguished from my prior structure wherein the magnifying device was moved relatively to the tool, in order to greatly facilitate the measurement thereof.

A further object of the instant invention is the provision of an instrument which is highly accurate, durable in construction and which may be easily adapted for use with projection equipment for producing a greatly enlarged image of the cutting teeth on a screen or the like to increase the accuracy of the rake or hook angle measurement.

Further objects and advantages of this invention will be more clearly understood from the following description and from the accompanying drawings in which:

Fig. 1 is a plan view of the instrument embodying my invention.

Fig. 2 is a side view thereof.

Fig. 3 is a fragmentary side view of the device with parts in central vertical section to more clearly illustrate the construction of the instrument.

Fig. 4 is a fragmentary end view of the front of the instrument with parts removed to more clearly illustrate its construction.

Fig. 5 is a similar view showing the opposite end of the instrument.

Fig. 6 is a diagrammatic plan view illustrating the first position occupied by a tap whose hook angle is to be determined.

Fig. 7 is a view illustrating the image seen through the microscope of the instrument when the tap is in the position illustrated in Fig. 6.

Fig. 8 is a diagrammatic plan view illustrating the second and third positions occupied by the tap in the process of measuring the hook angle.

Fig. 9 is a view illustrating the images seen through the microscope of the instrument when the tap is in the positions illustrated in Fig. 8.

Fig. 10 is a diagrammatic plan view illustrating the final position of the tap.

Fig. 11 is a view of the image seen through the miscroscope of the instrument when the tap is in the final position illustrated in Fig. 10.

In the accompanying drawings, I have illustrated the manner in which my improved instrument is constructed and used for measuring the hook angle of a tap in order to more clearly illustrate the advantages of the instrument over that disclosed in my above mentioned patent and also because the primary use of the instrument will be for the measurement of taps since these cutting tools have heretofore proved to be the most difficult to measure. Although I have illustrated a tap having teeth with concave cutting faces and the measurement of the hook angle thereof, it will be clearly understood from the following description that the rake angle of taps having straight cutting faces can be determined in the same manner without modification of the instrument.

Referring to the drawings, it will be seen that my instrument includes a base 5 having a ring 6 secured to the upper surface thereof by screws 7 or the like. Disposed within said ring and extending upwardly therefrom is a circular table 8 which is rotatable relatively to the base 5 and the ring 6 about an axis of rotation extending perpendicularly to said base and indicated at 9. Suitable bearing means, not shown, are utilized to rotatably mount the table 8 and said table includes a lower portion 8–a and an upper portion 8–b of a smaller diameter providing an annular flange therearound which has an upwardly angled surface containing indicia providing a degree scale 10 which cooperates with an indicator 11 on the ring 6 to denote the angle through which the table rotates. For the purposes of illustration, it will be said that the table 8 has a normal axis, indicated at 12, which extends diametrically thereacross and intersects its axis of rotation 9 as shown in Fig. 1.

The upper section 8–b of the table 8 contains a dovetailed slot 13 which extends diametrically thereacross or, as illustrated in Fig. 1, symmetrically with respect to the normal axis 12, and the portions of the table adjacent the opposite edges of the slot 13 are cut away to provide notches 14—14 for the reception of elongated plates 15—15 which are secured to the table by screws 16 and project over the edges of the slot 13 as best illustrated in Figs. 4 and 5.

A carrier member 17 in the form of an elongated block is slidably contained in the slot 13 and is retained therein by the plates 15—15 which engage longitudinally extending shoulders 18—18 on said carrier member. A post 19 is secured to the rear end of the carrier member 17 by any suitable means and projects upwardly therefrom between the plates 15—15 and perpendicularly to said carrier member. The opposite front edges of said post are bevelled, as at 19-a, and it is provided with vertically-spaced holes 20.

The tap supporting means on said post 19 include a supporting block 21 having a V-shaped groove 21-a in its rear face which cooperates with the bevelled edges of the post 19 to position the supporting block 21 centrally thereof. Said block is securely clamped to the post 19 by means of a screw 22 which extends through the desired hole 20 and is threaded into the block as clearly illustrated in Fig. 1. The front face of the block is provided with a V-shaped groove 23 which is disposed symmetrically with respect to the normal axis 12 of the table and is adapted to receive the shank of a tap. A spring finger 24 is secured to the side of the block and extends over the groove 23.

In order to permit adjustment of the carrier member 17 in the slot 13 and in a direction perpendicular to the axis of rotation of the table 8, I have provided an adjusting screw 25 which extends longitudinally into the slot 13 and is threaded into an elongated threaded hole 26 in the post and the carrier member as illustrated in Fig. 3. A yoke 27 is secured to the table 8 adjacent the rear end of the slot 13 and said yoke rotatably supports the head 28 of the adjusting screw and retains said screw against axial movement.

In the embodiment of the invention illustrated in the drawings, the means for providing an enlarged image of the tap teeth is in the form of a low power, compound microscope 29 of conventional form which is slidably carried on a stationary support 30 that is secured to the base and is adjustable longitudinally of said support by means of hand wheels 31—31. The microscope contains a conventional lens system including a transparent member 32 containing a hairline 33 and an eyepiece 34 through which the enlarged image of the tap teeth is viewed with the hairline 33 superimposed thereon.

The optical axis of the microscope, which is also the normal axis thereof is indicated by the numeral 12-a and the hairline 33 is disposed on said optical axis and extends parallel to the axis of rotation 9 of the table 8. When said table is in the "zero" position illustrated in Fig. 1, the optical axis 12-a of the microscope, the hairline 33, the normal axis 12 of the table 8 and the axis of rotation 9 thereof all lie in the same vertical plane. Although the microscope is adjustable along its optical axis, the hairline will always remain in the plane of said axis and parallel to the axis of rotation of the table.

The procedure for measuring the hook angle of the tap illustrated is as follows:

The supporting block 21 is first located on the post 19 to support the tap 35 vertically with respect to the table 8. The shank of the tap is then inserted into the V-shaped groove 23 in the face of the block 21 and under the spring finger 24 which slidably retains the shank in said groove and the tap is adjusted vertically in the supporting block 21 until the teeth 36 thereof are disposed in the field of vision of the microscope 29. The table 8 is then rotated until the proper zero mark on the scale 10 is aligned with the indicator 11 on the ring 6 as illustrated in Fig. 1. The microscope is then adjusted until the image of the tap teeth and the hairline is clearly seen through the eyepiece thereof. The tap is then rotated about its own axis 37 in the groove 23 until the points 38 at the crests of the teeth adjacent a flute thereof lie along the hairline 33. Fig. 6 diagrammatically illustrates the position of the tap with respect to the instrument when so adjusted and it will be seen therefrom that the longitudinal axis 37 of the tap, the axis of rotation 9 of the table, the points 38 and the hairline 33 all lie in the vertical plane of the normal axis 12 and the optical axis 12-a, and when viewed through the eyepiece, the points 38 at the crests of the tap teeth will appear as illustrated in Fig. 7. It will be understood that since the microscope contains a compound lens system, the image seen through the eyepiece is reversed.

The table 8 is then rotated in a counter-clockwise direction, as viewed in Fig. 1, to any desired position which, for the purposes of illustration, will be forty-five degrees. Since the tap is carried by the table 8, it will then assume the position illustrated in dotted lines in Fig. 8 wherein it will be noted that the normal axis 12 of the table is now disposed angularly with respect to the optical axis 12-a of the microscope, but that the points 38 of the tap teeth still lie in the plane of said normal axis 12 and in alignment with the axis of rotation 9 and the longitudinal axis 37 of the tap. When viewed through the microscope, the points 38 at the crests of the teeth will appear in the position illustrated in dotted lines in Fig. 9, or to the left of the hairline 33.

The adjusting screw 25 is then rotated in the proper direction to cause rearward movement of the carrier member 17 in the slot 13 which will thereby carry the tap rearwardly relatively to the table, but along the normal axis 12 thereof. The tap is viewed through the microscope while the adjusting screw is being turned and said tap is moved until the points 38 at the crests of its teeth are again brought into alignment with the hairline wherein the tap will then be located in the position illustrated in full lines in Figs. 8 and 9. It will be understood from Figs. 8 and 9, that the points 38 at the crests of the tap teeth now lie along the axis of rotation 9 of the table 8 so that upon rotation of the table in either direction, said tap will revolve about an axis extending along the points 38.

The table is then rotated in a clockwise direction until the points at the crests of the tap teeth and the points 38-a at the roots thereof are brought into alignment with the hairline 33 or, as seen through the microscope, into the position shown in Fig. 11. The tap is now located as illustrated in Fig. 10 wherein the points at the crests and at the roots of the teeth are disposed along the optical axis 12-a. However, the normal axis 12 of the table is now angularly disposed with respect to said optical axis and the angle "a" between the axes 12 and 12-a and denoted on the scale 10 is the hook angle of the tap.

The rake angle of a tap having straight cutting faces would be obtained in the same manner above described. Of course, the straight cutting faces of such a tap would appear as a straight line against the hairline 38 instead of the scalloped line illustrated in Fig. 11, which is a result of the concave faces of the tap shown.

The microscope 29 illustrated in the drawings may be replaced by a projection device of any conventional form which may be utilized for producing a greatly enlarged image of the cutting teeth on a screen or the like to increase the accuracy of the rake angle measurement.

It will be understood that the instrument is not limited to the measurement of taps, but can be applied to circular milling cutters or other such devices by merely modifying the tap supporting means on the post 19 to accommodate the particular cutting tool to be measured and position it in such a manner that the cutting edges of its teeth lie parallel to the axis of rotation 9 of the table 8.

I claim:

1. An instrument for measuring the rake or hook angle of the teeth of a tap, said instrument including a base, a carrier member rotatable relatively to said base, a post extending perpendicularly from said carrier member, means on said post for supporting said tap with the points at the crests of its teeth lying along the axis of rotation of said carrier member, stationary means on said base for viewing said teeth and including a visible reference line extending parallel to said axis of rotation, and cooperating scale and indicator means on said carrier member and said base for indicating the angle through which said carrier member is turned.

2. An instrument as set forth in claim 1 wherein said tap supporting means includes a block extending from said post and having a V-shaped notch therein for the reception of the shank of the tap.

3. An instrument for measuring the rake or hook angle of the teeth of a tap, said instrument including a base, a table rotatably mounted on said base and having a normal axis intersecting its axis of rotation, means on said table for supporting a tap with its longitudinal axis intersecting said normal axis and the points at the crests of its teeth lying along the axis of rotation of said table, stationary means on said base for producing an enlarged image of said teeth and including a visible hairline extending parallel to the said axis of rotation, and cooperative scale and indicator means on said table and said base to indicate the angle through which the table is turned.

4. An instrument for measuring the rake or hook angle of the teeth of a tap, said instrument including a base, a table rotatably mounted on said base and having a normal axis intersecting its axis of rotation, means on said table for supporting a tap with its longitudinal axis intersecting said normal axis and lying parallel to said axis of rotation; said tap supporting means being movable relatively to said table and along the normal axis thereof, stationary means on said base for producing an enlarged image of the tap teeth and including a visible hairline extending parallel to the axis of rotation of said table, and a scale on said table cooperating with an indicator on said base to indicate the angle through which the table is turned.

5. An instrument for measuring the rake or hook angle of the teeth of a tap, said instrument including a base, a table rotatably mounted on said base and having a normal axis intersecting its axis of rotation, a carrier member slidably mounted on said table and movable along said normal axis, a post extending perpendicularly from said carrier member, means on said post for supporting a tap with its longitudinal axis intersecting said normal axis and lying parallel to said axis of rotation, a stationary magnifying device on said base for producing an enlarged image of said teeth including a hairline extending parallel to said axis of rotation, and a scale on said table cooperating with an indicator on said base to indicate the angle through which the table is turned.

6. An instrument as set forth in claim 5 wherein there is provided an adjusting screw that is rotatably secured to said table and is threaded into said carrier member to permit adjustment thereof.

7. An instrument for measuring the rake or hook angle of the teeth of a tap, said instrument including a base, a table rotatably mounted on said base and having a normal axis intersecting its axis of rotation and a slot extending thereacross on said normal axis, a carrier member slidable in said slot, an adjusting screw rotatably secured to said table and threaded into said carrier member for moving said carrier member in said slot, a post extending perpendicularly from said carrier member, means on said post for supporting a tap with its longitudinal axis intersecting said normal axis and lying parallel to said axis of rotation, a magnifying device secured to said base for producing an enlarged image of the tap teeth and including a visible hairline extending parallel to said axis of rotation; said table having a scale thereon which cooperates with an indicator on said base to denote the angle through which the table is turned.

8. An instrument as set forth in claim 7 wherein the tap supporting means on said post includes a block which extends perpendicularly from the post and has a V-shaped notch in its end portion which is disposed symmetrically with respect to said normal axis of the table and is adapted to receive the shank of a tap.

9. An instrument as set forth in claim 8 wherein said block is adjustable on said post to accommodate taps of different lengths.

10. An instrument for measuring the rake or hook angle of a cutting tooth of a cutting tool; said instrument including means providing a normal axis, means for supporting said cutting tool for rotation about an axis of rotation extending along the crest of the tooth to be measured and intersecting said normal axis, stationary means for viewing said tooth including a visible reference line lying in a plane containing said normal axis and said axis of rotation, and cooperating scale and indicator means for indicating the angle through which said cutting tool is revolved relatively to said normal axis.

11. An instrument for measuring the rake or hook angle of a cutting tooth of a cutting tool; said instrument including means providing a normal axis, means for supporting said cutting tool for rotation about its own axis relatively to said supporting means to permit alignment of the crest of the tooth to be measured with a fixed axis extending perpendicularly to and intersecting said normal axis, the said supporting means being adapted for rotating the tool about said fixed axis, and stationary means for viewing said tooth including a visible reference line lying in a plane containing said normal axis and said fixed axis.

12. An instrument for measuring the rake or hook angle of a cutting tooth of a cutting tool, said instrument including means providing a normal axis, a rotatable member having an axis of rotation intersecting said normal axis, means on said rotatable member for supporting said cutting tool with the crest of the tooth to be measured lying on said axis of rotation whereby, upon rotation of said rotatable member, said cutting tool revolves about the crest of said tooth, stationary means for viewing said tooth including a visible reference line lying in a plane containing said normal axis and said axis of rotation, and cooperating scale and indicator means for indicating the angle through which said rotatable member is rotated relatively to said normal axis.

13. An instrument for measuring the rake or hook angle of a cutting tool, said instrument including means providing a normal axis, a rotatable member having an axis of rotation intersecting said normal axis, means on said rotatable member for supporting the cutting tool; said supporting means being movable relatively to said rotatable member along said normal axis to permit alignment of the crest of the tooth to be measured with said axis of rotation, stationary means for viewing said tooth including a visible reference line lying in a plane containing said normal axis and said axis of rotation, and cooperating scale and indicator means for indicating the angle through which said rotatable member is turned relatively to said normal axis.

References Cited in the file of this patent

UNITED STATES PATENTS

| 199,015 | Bausch | Jan. 8, 1878 |
| 1,424,941 | Pirwitz | Aug. 8, 1922 |
| 1,959,537 | Kuhne | May 22, 1934 |
| 2,420,951 | Williams et al. | May 20, 1947 |
| 2,648,138 | Gase | Aug. 11, 1953 |

FOREIGN PATENTS

| 218,399 | Switzerland | Apr. 1, 1942 |
| 876,855 | France | Aug. 24, 1942 |
| 904,282 | France | Feb. 19, 1945 |
| 994,312 | France | Aug. 8, 1951 |